Figure 1:
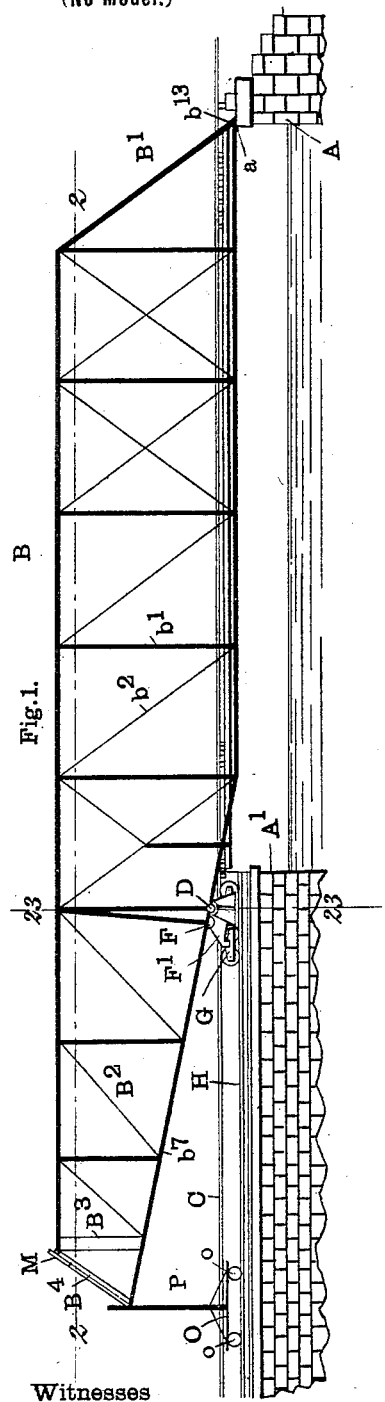

No. 630,879. Patented Aug. 15, 1899.
C. F. FRANSON & E. WILMANN.
DRAWBRIDGE.
(Application filed Aug. 10, 1898.)
(No Model.) 5 Sheets—Sheet 1.

Witnesses
W. A. Alexander
A. C. Fowler

Inventors
Charles F. Franson
Edward Wilmann
By Attorney Benj. F. Rex

No. 630,879. Patented Aug. 15, 1899.
C. F. FRANSON & E. WILMANN.
DRAWBRIDGE.
(Application filed Aug. 10, 1898.)
(No Model.) 5 Sheets—Sheet 2.
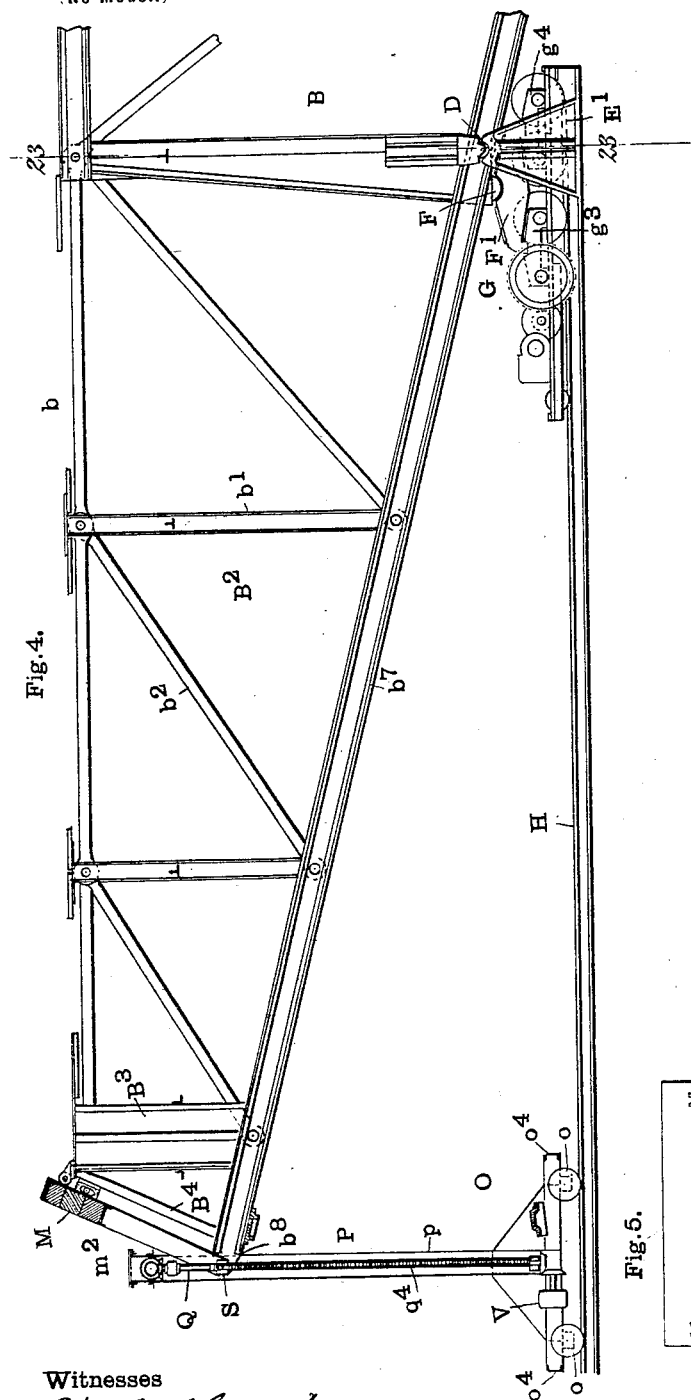
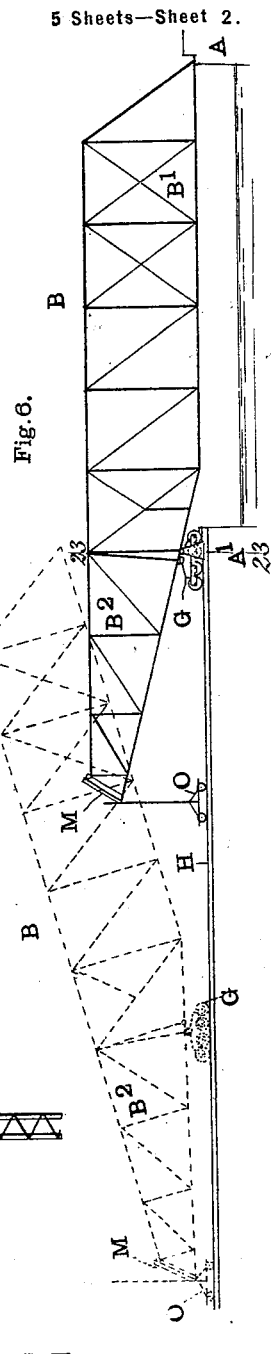
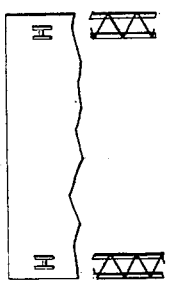
Witnesses
W. A. Alexander
A. C. Fowler
Inventors
Charles F. Franson
Edward Wilmann
By Attorney Benj. F. Rex No. 630,879. Patented Aug. 15, 1899.
C. F. FRANSON & E. WILMANN.
DRAWBRIDGE.
(Application filed Aug. 10, 1898.)
(No Model.) 5 Sheets—Sheet 3.
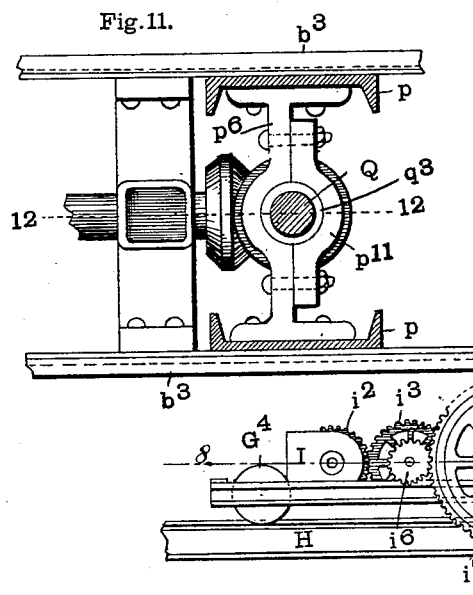
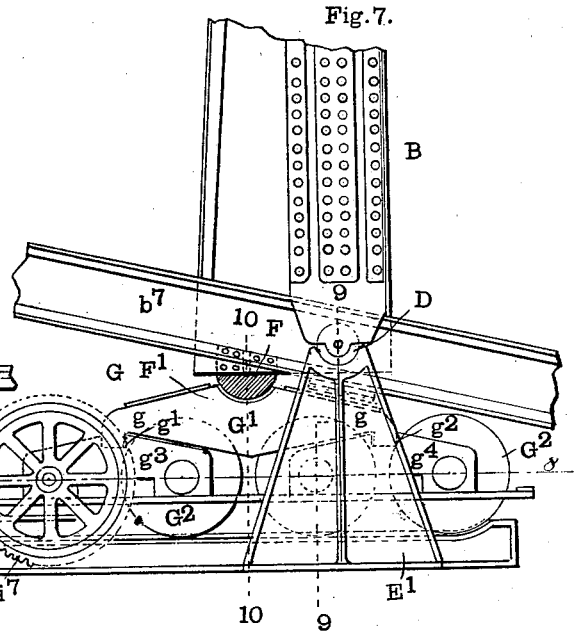
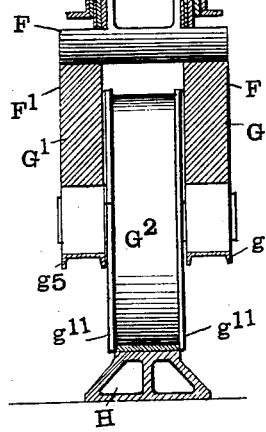
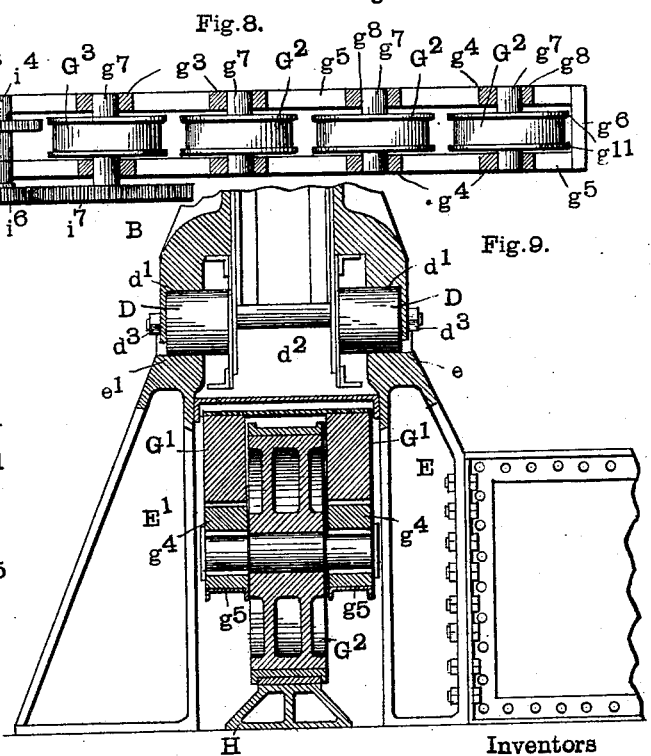
Witnesses
Inventors
Charles F. Franson
Edward Wilmann
By Attorney No. 630,879. Patented Aug. 15, 1899.
C. F. FRANSON & E. WILMANN.
DRAWBRIDGE.
(Application filed Aug. 10, 1898.)
(No Model.) 5 Sheets—Sheet 4.
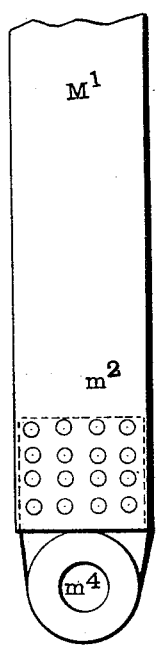
Fig. 13.
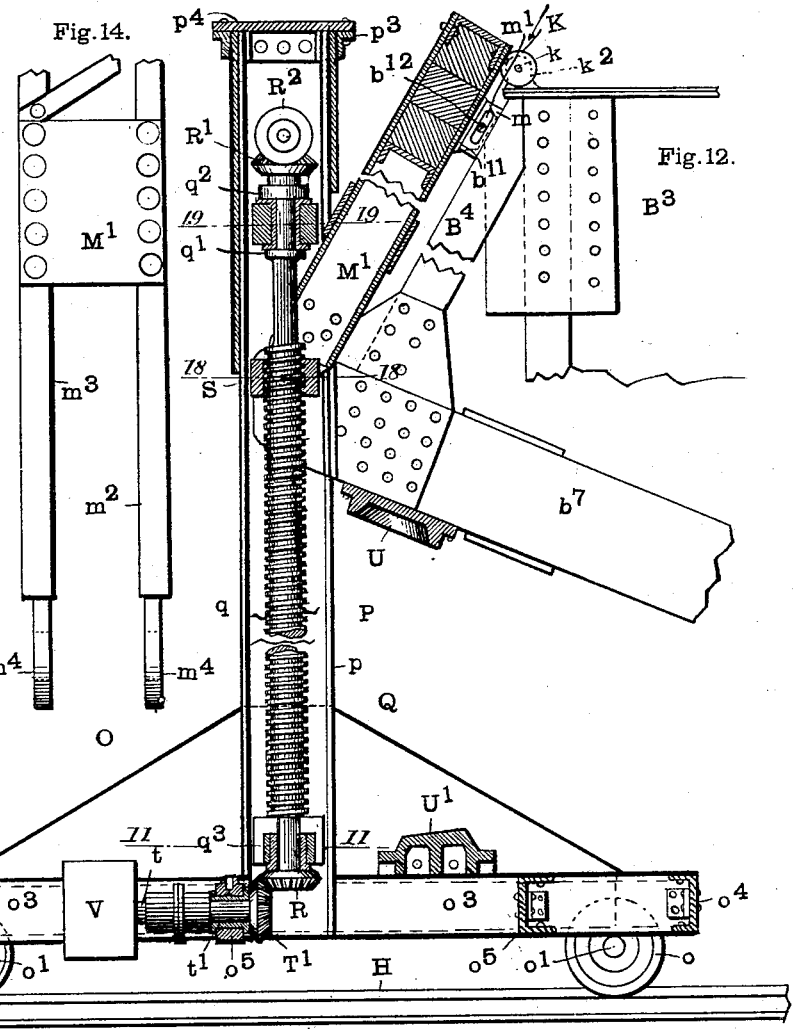
Fig. 14. Fig. 12.
Fig. 15. Fig. 17. Fig. 16.
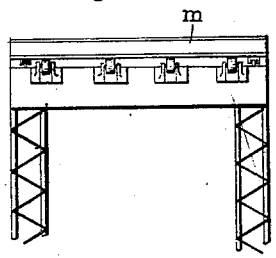
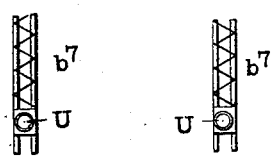
Witnesses
W. A. Alexander.
A. C. Fowler
Inventors
Charles F. Franson
Edward Wilmann
By Attorney Benj. F. Rex No. 630,879. Patented Aug. 15, 1899.
C. F. FRANSON & E. WILMANN.
DRAWBRIDGE.
(Application filed Aug. 10, 1898.)
(No Model.) 5 Sheets—Sheet 5.
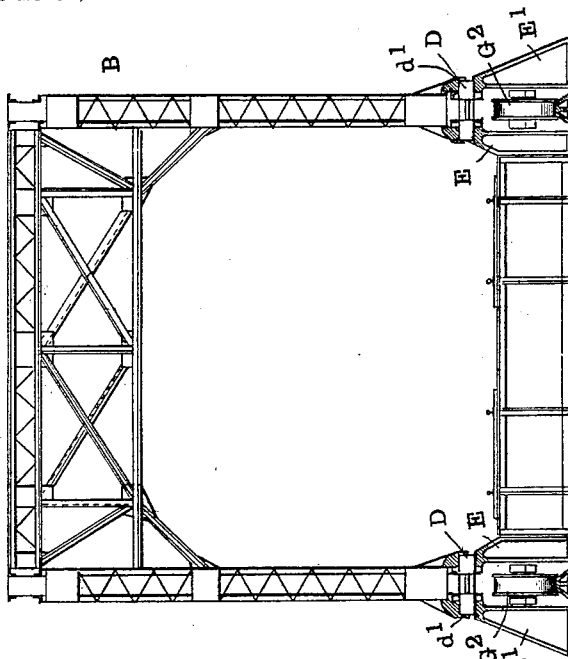
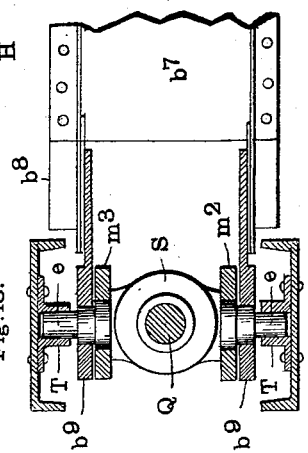
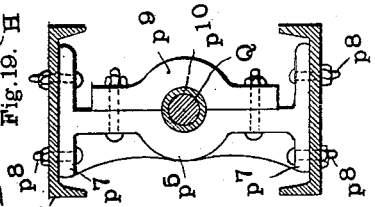
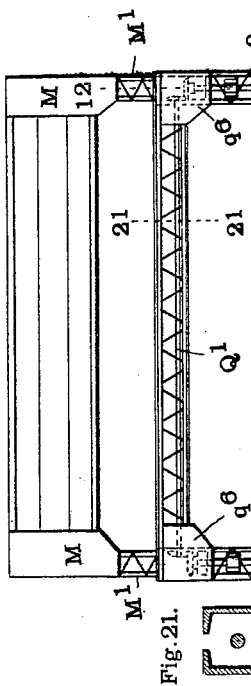
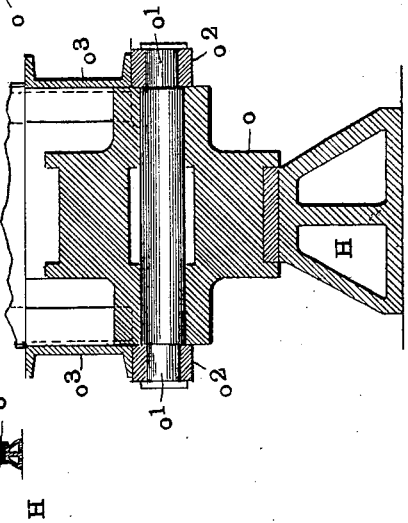
Witnesses
Inventors
Charles F. Franson
Edward Wilmann
By Attorney

UNITED STATES PATENT OFFICE.

CHARLES F. FRANSON, OF ST. LOUIS, MISSOURI, AND EDWARD WILMANN, OF CHICAGO, ILLINOIS.

DRAWBRIDGE.

SPECIFICATION forming part of Letters Patent No. 630,879, dated August 15, 1899.

Application filed August 10, 1898. Serial No. 688,297. (No model.)

*To all whom it may concern:*

Be it known that we, CHARLES F. FRANSON, residing at St. Louis, in the State of Missouri, and EDWARD WILMANN, residing at Chicago, in the county of Cook and State of Illinois, citizens of the United States, have invented certain new and useful Improvements in Drawbridges, of which the following is a specification.

Our invention relates chiefly to what are known as "rolling" drawbridges; and the main objects of our invention are, first, to improve the stability of such bridges when closed; second, to enable the river-arm of such a bridge to be fully braced laterally between bearings both at top and bottom; third, to avoid the usual uncertainty in regard to stress; fourth, to provide an improved form of movable tilting span; fifth, to provide improved means for tilting the span and for causing it to return to a horizontal position; sixth, to provide improved means for transferring the weight of the span from fixed to movable supports and from the movable supports back to the fixed supports; seventh, to provide improved means for supporting and moving the movable span when tilted, and, eighth, to provide a construction which, taken as a whole, will be lighter and cheaper in proportion to its strength and more simple than any other form of rolling drawbridge with which we are acquainted. We attain these objects by mechanism whose preferred form is illustrated in the accompanying drawings, in which—

Figure 2:
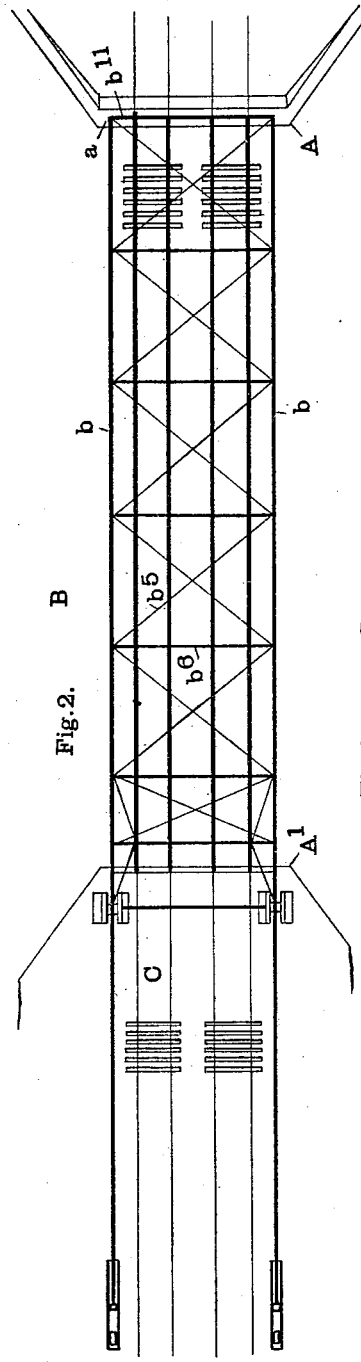
Figure 3:
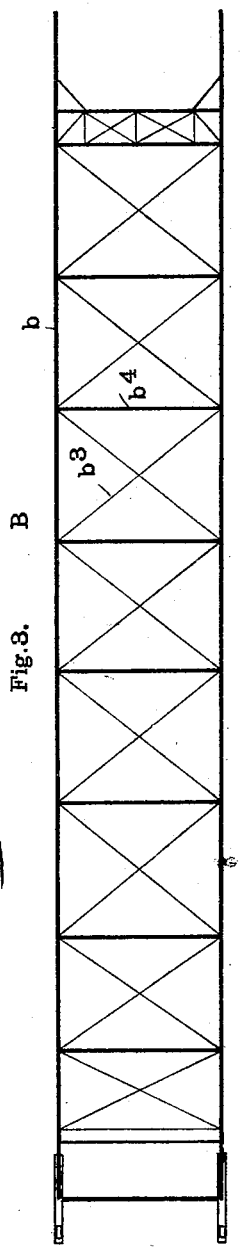

Figure 1 is a diagrammatic side elevation of a rolling drawbridge embodying our invention with details omitted. Fig. 2 is a horizontal cross-section on line 2 2, Fig. 1, showing a diagram of the bottom lateral bracing and omitting the front trucks shown in Fig. 1. Fig. 3 is a plan view of the top of the bridge, showing lateral bracing and rear trucks, but omitting other details. Fig. 4 is in part a detailed side elevation, on an enlarged scale, of the tail end of the movable span and its supports and in part a longitudinal section on line 12 12, Fig. 20, of means for assisting in supporting said span when tilted and for lifting and supporting a portion of the weight of a movable counterpoise. Fig. 5 is a detailed inverted plan view of said counterpoise with parts broken away. Fig. 6 is a diagrammatic side elevation, on a reduced scale, showing the movable span in its normal position in full lines and in the position assumed when tilted and rolled back in dotted lines. Fig. 7 is a detailed side elevation, on an enlarged scale, showing a stationary and a movable pivotal support for the movable span with a portion of the weight of the span resting on the former and the pin or journal which turns on the latter lifted from its bearing. Fig. 8 is in part a horizontal cross-section on line 8 8, Fig. 7, and in part a plan view of the wheels and gearing shown in Fig. 7. Fig. 9 is a detailed view, on an enlarged scale, of a vertical cross-section on line 9 9, Fig. 7. Fig. 10 is a similar view on line 10 10, Fig. 7. Fig. 11 is a fragmentary horizontal cross-section on line 11 11, Fig. 12. Fig. 12 is a detailed vertical longitudinal section, on an enlarged scale, on lines 12 12, Figs. 11 and 20. Fig. 13 is a side elevation, on an enlarged scale, of a detail of the counterpoise. Fig. 14 is a plan view of the detail illustrated in Fig. 13. Fig. 15 is a detailed view, on a reduced scale, looking in the direction of the arrow shown in Fig. 12, with parts broken away. Fig. 16 is an inverted plan view, on a reduced scale, of the outer ends of the two bottom chords of the tail end of the span with connecting parts omitted. Fig. 17 is an enlarged side elevation of a portion of a detail illustrated in Fig. 18. Fig. 18 is a horizontal cross-section, on an enlarged scale, on line 18 18, Fig. 12. Fig. 19 is a similar view on line 19 19, Fig. 12. Fig. 20 is a rear end elevation with parts omitted. Fig. 21 is a cross-section on line 21 21, Fig. 20. Fig. 22 is an enlarged vertical longitudinal section of a detail on lines 12 12, Fig. 20; and Fig. 23 is a vertical cross-section on line 23 23, Figs. 1, 4, and 6.

Similar letters refer to similar parts throughout the several views.

In our drawings we have for purposes of convenience shown our invention embodied in a bridge having but one span; but, as will become obvious on reading our specification, the number of spans is immaterial.

A and A', Figs. 1 and 2, represent abutments, and $a$ a ledge upon which the outer end of our movable span is intended to rest.

B, Figs. 1, 2, 3, 4, 6, 7, 9, 10, and 23, is a movable span having a river-arm B' and a tail end B². The sides of said span are shown composed of a pair of trusses $b$, having braces $b'$ and ties $b^2$ of common form and arrangement. The tops of the trusses $b$ are shown connected from end to end by means of lateral ties $b^3$ and braces $b^4$, and the bottoms of the trusses $b$ are shown connected in the river-arm B' by lateral ties $b^5$ and braces $b^6$; but said bottom braces and ties are preferably omitted from the tail end of the span, whose bottom is preferably left open, as shown in Figs. 2 and 20. The bottoms $b^7$ of the sides of the tail end B² of the span B are shown inclining upward from their inner to their outer ends, so as to enable the river-arm to be tilted up without the use of a pit, such as would be necessary in a bascule-bridge. Leaving the spaces between the lower chords of the sides of the river-arm unobstructed by either lateral ties or braces is also of assistance in that connection, for it enables the sides of the tail end to descend below the level of the roadway, which in the drawings is represented as a railway C, Figs. 1 and 2; but the nature of the roadway is immaterial.

The tail end B² of the span B preferably, but not necessarily, carries fixed weights B³, Figs. 1, 4, and 23, and beams B⁴, connecting the tops and bottoms of the trusses $b$ at their rear ends preferably slant inward from bottom to top, as shown.

The outer extremities $b^8$ of the bottom chords $b^7$ of the sides of the tail end B² of the span B are preferably forked, substantially as shown in Figs. 16 and 18, and the arms $b^9$ of the fork preferably contain parallel slots $b^{10}$, Figs. 17 and 18, which may be substantially vertical when the span is horizontal, as shown, though that is not essential. The precise form of the sides of the tail end B² of the span B shown is immaterial. Any other form which will answer the same purpose should be considered the full equivalent of the one shown, and many such forms will at once suggest themselves to the reader. When in its normal position, the outer end $b^{13}$ of the span B preferably rests on the fixed support $a$, and the inner end of the span B is preferably supported upon suitable pivots, preferably rollers D, Figs. 1, 4, 6, 7, 9, and 23, a pair for each side. Each pair is shown held in place in recesses $d'$ in the side of the span by means of a rod $d^2$, whose ends are shown provided with nuts $d^3$, which combination of two rollers and the connecting-pin may be regarded as a pivot, and we desire to include it among other forms of pivot where we speak of "pivots" in general terms in our claims. The inner roller on each side is shown in Figs. 9 and 23 resting in a bearing $e$ and the outer one in a similar bearing $e'$, formed, respectively, in the tops of supports E and E'.

We prefer to use the arrangement shown; but any other suitable means for pivotally supporting the span may be substituted for them without departing from the essence of our invention when considered in its broader scope, and though we prefer to make the pivotal supports for the inner end of the span upon which it bears when the bridge is closed stationary and consider it very desirable that they should be fixed that is not essential to our invention when viewed generically.

To the rear of the rollers D a pair of journals F are arranged opposite each other and attached to the span B, one on each side. Movable bearings F' are provided for each of said journals, which are preferably supported upon wheels. In the form of our apparatus shown each of the journals F is provided with two bearings supported by a truck G, Figs. 1, 4, 6, 7, 8, 9, 10, and 23. The bearings of each journal are shown formed in the tops of two parallel coupling-plates G', whose respective ends $g$ rest in recesses $g'$ and $g^2$, formed, respectively, in parallel side frames $g^3$ $g^3$ and $g^4$ $g^4$. The side frames $g^3$ and $g^4$ on each side are connected at bottom by beams $g^5$, and the extreme ends of the beams $g^5$ are shown connected by cross-ties $g^6$.

The trucks G are each shown supported upon four large wheels G² and G³ and one smaller wheel G⁴, arranged in line. The number of the wheels is, however, immaterial. The axles $g^7$ of each of the wheels G² are journaled in bearings G⁸, formed in the side frames $g^3$ and $g^4$, and the axle $g^9$ of the wheel G⁴ is journaled in bearings $g^{10}$ in the beams $g^5$. The wheels G², G³, and G⁴ are preferably provided with flanges $g^{11}$ on each side. A pair of parallel rails H are preferably arranged one on each side of the main roadway and preferably below its level, as shown in Figs. 1, 23, and 24, and upon these the trucks G run. Said trucks may be propelled in any convenient manner. Preferably each carries a motor at I, Figs. 7 and 8, whose character is immaterial and from which motion may be communicated to the truck-wheels in any convenient way.

In the drawings, I' represents a driving-shaft journaled in bearings $i$ and having a gear-wheel $i^2$ attached thereto, which meshes in with a gear $i^3$, attached to a shaft $i^4$, journaled in bearings $i^5$, and having attacoed to its outer end a pinion $i^6$, which meshes in with a gear $i^7$, attached to the axle $g^7$ of the wheel G³, as shown most clearly in Figs. 7 and 8.

Near its upper end each of the beams B⁴ preferably has attached thereto a pair of parallel plates $b^{11}$, whose sides are preferably parallel with those of the span B and which are connected by a pin $b^{12}$.

On the top of the tail end B² of the span, near its outer extremity, a series of friction-rollers K are arranged, substantially as shown in Figs. 12 and 15. Their spindles $k$ are shown journaled in bearings $k^2$.

M, Figs. 1, 4, 5, 6, and 20, represents a movable counterpoise whose upper end rests upon the rollers K. From near the upper end thereof, near each side, a hinge-plate $m$ projects, which, as shown, contains a slot $m'$, and said plates are each shown projecting between a pair of the plates $b^{11}$ and connected to the plates between which it enters by means of a pin $b^{12}$ passing through its slot $m'$, Figs. 5, 12, and 15. Said counterpoise M is provided with two legs M', Figs. 1, 4, 5, 6, 12, and 20, each preferably composed of a pair of beams $m^2$ and $m^3$, preferably fastened together, as shown in Figs. 13, 14, and 20, and the ends of the beams $m^2$ and $m^3$ are each shown pierced by holes $m^4$, Figs. 13 and 14. Said counterpoise M is preferably supported as follows: On each of the rails H, Figs. 1, 2, 4, 6, 7, 9, 10, 12, 20, 22, 23, and 24, back of the movable pivotal support hereinbefore descibed, we preferably arrange a car O, Figs. 1, 4, 11, 12, 21, and 22, which runs upon wheels $o$, whose axles $o'$ turn in bearings $o^2$, attached to side frames $o^3$, between which said wheels are arranged one before the other. The side frames are shown connected by end pieces $o^4$ and intermediate cross-pieces $o^5$ and support a column P, braced on each side by side plates $p$, attached to the side frames of the truck O. Said column is shown composed of two vertical channel-beams $p$, diagonal bracing $p^2$, angles $p^3$, a top piece $p^4$, and cross-pieces $p^5$ and $p^6$. The cross-piece $p^5$ is shown fastened to the channel-beams $p$ through flanges $p^7$ by bolts $p^8$, Fig. 19, and has a piece $p^9$ bolted thereto, and between them there is a vertical bearing $p^{10}$, through which the upper end of a vertical shaft Q projects. Said shaft is shown provided with collars $q'$ and $q^2$, so attached as to be fixed longitudinally one above and one below said bearing, and on its lower end carries a gear R, Fig. 12, and on its upper end a gear R'. Throughout the greater part of its length said shaft is screw-threaded, as shown at $q$, and near its lower end it is journaled in a bearing $q^3$, Figs. 11 and 12, formed between the cross-piece $p^6$ and a part $p^{11}$, bolted thereto. The weight of the screw is preferably entirely supported by the cross-piece $p^5$ above mentioned, so as to dispense with unnecessary strength in the screw. The screw-threaded portion $q$ of the screw Q passes through and supports a nut S. (Shown most clearly in Figs. 12 and 18.) From each side of said nut a pin $e$ projects, and the outer ends of said pins preferably enter opposite vertical guides T, attached to the inner sides of the column P, Fig. 18. Each of the nuts S lies between the prongs of the forked end of one of the legs M' of the counterpoise M and also between the arms $b^{10}$ of the outer end $b^8$ of one of the lower chords of the tail end of the span B, which in the form of our bridge shown pass outside of the members $m^2$ and $m^3$ of the counterpoise-leg, and the pins $s$ each pass through the hole $m^4$ in the member of the counterpoise-leg on its side of the nut S and through the slot $b^{10}$ in the prong of the arm $b^9$, interposed between said member of the counterpoise-leg and the side of the column P. The precise arrangement of parts described is of course immaterial. The length of the slots $b^{10}$ in the outer extremities $b^8$ of the bottom chords of the sides of the tail end $B^2$ regulates the range of movement of the weight M with reference to the span B. When the nuts S are lowered until their pins $s$ rest in the bottoms of said slots, as they may be by rotating the screws Q, the greater part of the weight of the counterbalance M is brought to bear upon the pins $s$ of the nuts S and is transmitted by them to the tail end of the span B, and if after the weight reaches that position the lowering of the nuts S is continued the counterpoise M, if of the proper weight, will assist the tail end of the span and its fixed counterbalance-weights to overbalance the river-arm of the span, which otherwise preferably overbalances the tail end. When the river-arm is thus overbalanced, the tail end will sink and tilt the river-arm upward, and if the rotation of the shafts Q is continued in the proper direction the downward movement of the tail end of the span will continue until first the pin or pivot F is seated in its bearings F'. Next the rolls D are lifted from their bearings $e$ and $e'$, so as to throw the entire weight of the span upon the trucks G, and finally guide-blocks U, Figs. 4, 12, and 16, attached to the under side of the tail end $B^2$, come to rest upon the bearing-blocks U', one of which is preferably supported by and attached to each of the trucks O. As soon as this happens the span B is supported in a stable manner upon the trucks G and O and the rails H, upon which they run, and the truck-wheels, by reason of their projecting flanges, are able to support any lateral wind stress to which the bridge is liable to be subjected.

The two rear trucks O are preferably connected by a cross-piece P', which may be formed like the column P of beams $p$, connected by diagonal bracing $p^2$ or in any other suitable manner, and the motion of the shafts Q is preferably synchronized by connecting them by means of a shaft Q', supported in bearings $q^6$, formed in the inner sides of the columns P. Gears $R^2$ are attached one to each end of the shaft and mesh in with the gears R, attached to the vertical shafts Q. Each of the shafts Q is preferably driven by a motor V, of any suitable form, carried by the car supporting the shaft, and motion may be communicated from the motor to the shaft Q through a shaft $t$, journaled in a bearing $t'$ and having attached to its outer end a gear T', meshing in with the gear R, attached to the lower end of the vertical shaft Q.

When in operating our bridge the span B is tilted back in the manner we have described, so as to cause its weight to rest upon the trucks G and O, the river-arm B' is raised high enough to pass the abutments A and A', and there is nothing to interfere with moving the span B back out of the way of passing boats by means of the motors carried by the cars G, and in like manner when it is desired to close the bridge the span may be readily run forward and enough of the weight of the counterpoise lifted from the tail end of the span to enable the river-arm to overbalance it and sink until the weight of the bridge is transferred back from the trucks G to the stationary supports E and E', and in its final position it comes to rest with part of its weight resting on the supports E and E' and part on the ledge $a$ of the bridge-abutment A.

We have referred to the roadway C as a "railway" and have shown rails $c$ resting on sleepers $c'$, which for convenience are omitted, except at two points; but, as will be obvious, the roadway forms no part of our invention, and any form of roadway may be substituted for the one shown.

Our bridge is as suitable for use as a foot-bridge as it is for railway purposes. In describing the form of bridge in which we have shown our invention embodied we have given a detailed description of said form such as seemed necessary to an understanding of the construction and mode of operation of that particular form; but we do not wish to be understood as confining our claims to the special form of bridge shown. So far as we are aware our invention is not confined to details of form, but is broadly new, and we desire our claims to be construed broadly.

We claim—

1. The combination in a drawbridge, of a span having an upwardly-tilting river-arm, and wheels for carrying said span back and forth.

2. The combination in a drawbridge, of a span having an upwardly-tilting river-arm, wheels for carrying said span back and forth, and rails upon which said wheels run.

3. The combination in a drawbridge, of a movable span; stationary bearings upon which a portion of said span's weight rests when the bridge is closed and upon which said span is tilted when being opened; and movable supports to which the weight of the span passes from the stationary supports when the river-arm is tilted up to a predetermined angle.

4. The combination in a drawbridge, of a movable span, stationary bearings upon which a portion of said span's weight rests when the bridge is closed, and upon which said span is adapted to turn in a vertical plane; movable bearings adapted to receive the transfer of the weight of said span when it is tilted to a certain angle; and means enabling the span to turn on the latter bearings.

5. The combination in a drawbridge, of a tilting span; stationary supports upon which said span is adapted to turn; a pair of trucks to which the weight of said span passes from the stationary supports when the span is tilted to a given angle; and means for propelling said trucks.

6. The combination in a drawbridge, of a tilting span; stationary supports upon which said span is adapted to turn; a pair of trucks to which the weight of said span passes from the stationary supports when tilted to a given angle, rails upon which said trucks run; and means for preventing the wheels of said trucks from being forced from said rails by lateral thrusts.

7. The combination in a drawbridge, of a tilting span; stationary supports upon which said span is adapted to turn; a pair of trucks to which the weight of said span passes from the stationary supports when the span is tilted to a given angle; and another pair of trucks adapted to receive a portion of the span's weight when it reaches its greatest angle of inclination, and, to assist the first-mentioned trucks in carrying it; and rails upon which said trucks run.

8. The combination in a drawbridge, of stationary supports; a movable span adapted to turn on said supports and having a river-arm, and a tail end lighter than said arm; movable supports adapted and arranged to receive the transfer of the weight of said span from said stationary supports, when said span is tilted to a certain angle; and means for weighting said tail end, and causing it to overbalance the river-arm, and tilt the span onto said movable supports.

9. The combination in a drawbridge, of stationary supports; and a span which is adapted to turn in a vertical plane on said supports, and which has a tail end, the bottom of whose outer extremity is higher than the bottom of the river-arm, when the river-arm is horizontal.

10. The combination in a movable span for a drawbridge, of a tail end having sides, an open bottom, and lateral top bracing; and a river-arm having sides, and lateral bracing both at top and bottom.

11. The combination in a truss drawbridge-span, of a river-arm, having its sides connected both at top and bottom by lateral bracing and a tail end having its sides connected at top by lateral bracing; and its bottom open; and having the bottoms of its sides at its outer extremity higher than the bottom of the river-arm.

12. The combination in a drawbridge, of a span adapted to be tilted, and having a river-arm and tail end rigidly connected together; means for supporting the span while it is being tilted; a movable counterpoise-weight; means for moving the counterpoise and causing it and the tail end to overbalance the river-arm and force said arm to tilt upward; and wheels adapted to carry the span when tilted.

13. The combination in a drawbridge, of a span adapted to be tilted and having a tail end and river-arm; means for supporting it while being tilted; a movable counterpoise; means connecting the tail end and counterpoise which permit the counterpoise to be moved upward with reference to the tail end and a part of its weight lifted from said span, and which transmit the weight of the counterpoise to said tail end, when the counterpoise descends to its lowest position with reference to said tail end.

14. The combination in a drawbridge, of a span having a tail end and river-arm, and adapted to be tilted; means for supporting it while it is being tilted; a counterpoise; means connecting it with the tail end, which allow it a range of movement; a pair of vertical screws; a pair of nuts one on each screw; means for preventing said nuts from turning but permitting vertical movement; means for transmitting motion from said nuts to said weight and means for supporting said screws.

15. The combination in a drawbridge, of a span adapted to be tilted and having a tail end and river-arm; a movable counterpoise for weighting said tail end; a revoluble screw; means for suspending said screw in a vertical position; a nut on said screw; means for preventing the revolution of the nut and for guiding it vertically, and means for connecting the weight and nut.

16. The combination in a drawbridge of a span adapted to be tilted and having a tail end and river-arm; means for supporting said span while it is being tilted; a movable counterpoise for weighting the tail; a pair of revoluble screws; a pair of trucks each supporting one of said screws in a vertical position; means for synchronizing the movements of said screws; a pair of nuts, one on each screw, means for preventing the revolution of said nuts and guiding them vertically; and means for transmitting motion from said nuts to said counterpoise.

17. The combination in a drawbridge, of a span adapted to be tilted and having a tail end and river-arm; means for supporting said span while it is being tilted; a movable counterpoise for weighting the river-arm; a pair of trucks; a column rising from each truck; a suspension-bearing attached to each column, a vertical screw journaled in and suspended from each bearing, means for rotating the screws; means for synchronizing their movements; a nut on each screw; means for preventing said nuts from rotating and for guiding them vertically and means for transmitting motion from the nuts to said weight.

18. The combination in a drawbridge, of a movable span having a river-arm, and a tail end rigidly connected together; a stationary support for the outer end of the river-arm; stationary supports for the inner end of the span; means enabling said span to turn on the latter supports; movable supports arranged and adapted to receive the weight of the span from said stationary supports when the span is tilted up to a certain angle; means enabling said span to turn on said movable supports; trucks arranged back of said movable supports for receiving a part of the span's weight from said movable supports when the tail end reaches its lowest position and means for propelling said span and movable supports and trucks back and forth.

19. The combination in a drawbridge, of a movable span; stationary supports upon which it rests when closed; trucks having flanged wheels for moving it; rails upon which said trucks run; and means for tilting said span from said stationary supports onto said trucks.

20. The combination in a drawbridge, of a movable span, a pair of parallel rails and two pairs of trucks for moving said span, each truck having supporting-wheels arranged in line, and said trucks being arranged two on each rail, and being disconnected when said span does not rest thereon; substantially as described.

21. The combination in a drawbridge, of a movable span having a river-arm and a tail end rigidly connected together; a stationary support for the outer end of the river-arm; stationary supports for the inner end of said span; means enabling said span to turn on the latter supports; two pairs of trucks for moving the span, each pair arranged on parallel lines; rails upon which said trucks run; means for preventing the wheels of said trucks from being derailed by lateral thrusts; and means for preventing the span from moving laterally on the rear trucks; substantially as described.

22. The combination in a drawbridge, of a longitudinally-movable span, having an upwardly-tilting river-arm, and means for elevating the outer end of said arm.

CHARLES F. FRANSON.
EDWARD WILMANN.

Witnesses to the signature of Charles F. Franson:
BENJ. F. REX,
C. D. GREENE, Jr.

Witnesses to the signature of Edward Wilmann:
CHARLES G. SACHSE,
OSCAR REDDICK.